(12) United States Patent
Krapf et al.

(10) Patent No.: US 8,079,045 B2
(45) Date of Patent: Dec. 13, 2011

(54) PERSONAL VIDEO RECORDER AND METHOD FOR INSERTING A STORED ADVERTISEMENT INTO A DISPLAYED BROADCAST STREAM

(75) Inventors: Russell M. Krapf, Dana Point, CA (US); Timothy J. Elliott, Fountain Valley, CA (US); L. Jeffrey Kapner, III, Yorba Linda, CA (US)

(73) Assignee: Keen Personal Media, Inc., Irvine, CA (US)

( * ) Notice: Subject to any disclaimer, the term of this patent is extended or adjusted under 35 U.S.C. 154(b) by 1600 days.

(21) Appl. No.: 09/982,652

(22) Filed: Oct. 17, 2001

(65) Prior Publication Data
US 2003/0074661 A1    Apr. 17, 2003

(51) Int. Cl.
    *H04N 7/10*      (2006.01)
    *G06F 3/00*      (2006.01)
    *H04N 7/173*     (2011.01)
    *H04N 7/16*      (2011.01)

(52) U.S. Cl. .............. 725/34; 725/32; 725/42; 725/134; 725/142

(58) Field of Classification Search .................... 725/34, 725/38, 42, 46, 50, 54, 55, 88, 114, 118, 725/51, 35, 1–153, 102
See application file for complete search history.

(56) References Cited

U.S. PATENT DOCUMENTS

| | | |
|---|---|---|
| 5,446,919 A | 8/1995 | Wilkins |
| 5,696,965 A | 12/1997 | Dedrick |
| 5,758,257 A | 5/1998 | Herz et al. |
| 5,774,170 A * | 6/1998 | Hite et al. ........................ 725/34 |
| 5,798,785 A | 8/1998 | Hendricks et al. |
| 5,872,588 A | 2/1999 | Aras et al. |
| 5,990,927 A * | 11/1999 | Hendricks et al. ............. 725/132 |
| 6,002,393 A * | 12/1999 | Hite et al. ....................... 715/719 |
| 6,006,265 A | 12/1999 | Rangan et al. |
| 6,044,376 A | 3/2000 | Kurtzman, II |
| 6,088,722 A | 7/2000 | Herz et al. |
| 6,119,098 A | 9/2000 | Guyot et al. |
| 6,160,570 A | 12/2000 | Sitnik |

(Continued)

FOREIGN PATENT DOCUMENTS
WO    99/04561 A1    1/1999
(Continued)

OTHER PUBLICATIONS
PCT International Search Report dated Jul. 8, 2003; PCT/US02/32237.
(Continued)

*Primary Examiner* — Kristine Kincaid
*Assistant Examiner* — John Schnurr (57) ABSTRACT

The present invention may be regarded as personal video recorder and a method of displaying a targeted advertisement on a display in conjunction with displaying of a broadcast stream on the display. The method defines a viewer profile of a viewer of the display based on signals received by a controller indicating usage of a viewer control interface by the viewer, for example based on viewer reactions to a broadcast stream or to an advertisement. A targeted advertisement is selected from stored advertisements based on the viewer profile of the viewer of the display. The targeted advertisement is displayed on the display. The viewer profile is updated based on subsequent signals received by the controller indicating usage of the viewer control interface. The signals indicate viewer reactions, for example, a viewer reaction to a broadcast stream or a viewer reaction to an advertisement or a viewer purchase.

31 Claims, 6 Drawing Sheets

U.S. PATENT DOCUMENTS

| | | | |
|---|---|---|---|
| 6,161,142 A | 12/2000 | Wolfe et al. | |
| 6,163,316 A | 12/2000 | Killian | |
| 6,177,931 B1* | 1/2001 | Alexander et al. | 725/52 |
| 6,216,129 B1 | 4/2001 | Eldering | |
| 6,298,348 B1 | 10/2001 | Eldering | |
| 6,298,482 B1 | 10/2001 | Seidman et al. | |
| 6,314,451 B1 | 11/2001 | Landsman et al. | |
| 6,357,042 B2 | 3/2002 | Srinivasan et al. | |
| 6,404,977 B1 | 6/2002 | Iggulden | |
| 6,446,261 B1 | 9/2002 | Rosser | |
| 6,463,207 B1 | 10/2002 | Abecassis | |
| 6,463,585 B1 | 10/2002 | Hendricks et al. | |
| 6,466,967 B2 | 10/2002 | Landsman et al. | |
| 6,560,578 B2 | 5/2003 | Eldering | |
| 6,574,793 B1 | 6/2003 | Ngo et al. | |
| 6,587,127 B1 | 7/2003 | Leeke et al. | |
| 6,588,015 B1 | 7/2003 | Eyer et al. | |
| 6,668,133 B2 | 12/2003 | Yuen et al. | |
| 6,698,020 B1* | 2/2004 | Zigmond et al. | 725/34 |
| 6,718,551 B1* | 4/2004 | Swix et al. | 725/32 |
| 6,738,978 B1 | 5/2004 | Hendricks et al. | |
| 6,756,997 B1 | 6/2004 | Ward, III | |
| 6,813,776 B2 | 11/2004 | Chernock et al. | |
| 6,813,777 B1 | 11/2004 | Weinberger et al. | |
| 6,983,478 B1* | 1/2006 | Grauch et al. | 725/13 |
| 6,986,154 B1 | 1/2006 | Price et al. | |
| 7,260,823 B2* | 8/2007 | Schlack et al. | 725/9 |
| 2001/0023436 A1* | 9/2001 | Srinivasan et al. | 709/219 |
| 2002/0019769 A1 | 2/2002 | Barritz et al. | |
| 2002/0059602 A1 | 5/2002 | Macrae et al. | |
| 2002/0083439 A1 | 6/2002 | Eldering | |
| 2002/0083442 A1* | 6/2002 | Eldering | 725/34 |
| 2002/0083445 A1* | 6/2002 | Flickinger et al. | 725/35 |
| 2002/0104083 A1 | 8/2002 | Hendricks et al. | |
| 2002/0120498 A1 | 8/2002 | Gordon et al. | |
| 2002/0144263 A1 | 10/2002 | Eldering et al. | |
| 2002/0178447 A1* | 11/2002 | Plotnick et al. | 725/36 |
| 2003/0005052 A1 | 1/2003 | Feuer et al. | |
| 2003/0005437 A1 | 1/2003 | Feuer et al. | |
| 2003/0067554 A1 | 4/2003 | Klarfeld et al. | |
| 2003/0093792 A1 | 5/2003 | Labeeb et al. | |
| 2003/0110499 A1* | 6/2003 | Knudson et al. | 725/42 |
| 2003/0167202 A1 | 9/2003 | Marks et al. | |
| 2005/0097599 A1 | 5/2005 | Plotnick et al. | |

FOREIGN PATENT DOCUMENTS

| | | |
|---|---|---|
| WO | 99/52285 A1 | 10/1999 |
| WO | 00/01149 A1 | 1/2000 |
| WO | 00/04434 A2 | 1/2000 |
| WO | 01/22731 A1 | 3/2001 |
| WO | 01/31497 A1 | 5/2001 |

OTHER PUBLICATIONS

PCT International Search Report dated Jul. 16, 2002 from PCT/US/02988, 5 pages.

Supplementary European Search Report dated Jun. 10, 2009 from European Patent Application No. 02766542.1.

\* cited by examiner

PERSONAL VIDEO RECORDER AND METHOD FOR INSERTING A STORED ADVERTISEMENT INTO A DISPLAYED BROADCAST STREAM

CROSS REFERENCE TO RELATED APPLICATIONS

This application is related to U.S. patent application Ser. No. 09/982707, titled PERSONAL VIDEO RECORDER AND METHOD THAT INSERTS A STORED ADVERTISEMENT RESPONSIVE TO A VIEWER PURCHASE, filed concurrently with the present application, the entire contents of which are incorporated by reference herein, and U.S. patent application Ser. No. 09/982702, titled PERSONAL VIDEO RECORDER AND METHOD THAT INSERTS A STORED ADVERTISEMENT RESPONSIVE TO A SELECTED PROGRAM SEARCH, filed concurrently with the present application, the entire contents of which are incorporated by reference herein.

BACKGROUND OF THE INVENTION

1. Field of the Invention

The invention relates to a method of displaying an advertisement. More particularly, the invention relates to a method of selecting an advertisement based on a viewer profile defined by a viewer's interactions with a controller interface and to a personal video recorder operating in accordance with the method. The selected advertisement is displayed in conjunction with a broadcast stream on a display.

2. Description of the Related Art

A digital video recorder (DVR), like a conventional analog video cassette recorder (VCR), is coupled to a monitor or a television set in a viewer's home and receives program broadcast signals via a coaxial cable, a satellite dish, or an antenna for terrestrial radio frequency (RF) signals. In some instances, the DVR may include a modem that permits access to content from the Internet. In order to record a particular program, the video recorder starts and stops recording the program at a predetermined day and time.

A DVR allows a viewer to overcome the rigid time scheme according to which the programs are broadcast. That is, a viewer can decide whether to watch "live TV" or to record a program and watch it later at a more convenient day and time. Alternative systems provide for even more flexibility and viewer-specific television. For example, digital video recorders offered by Replay Networks® of Palo Alto, Calif. (in combination with ReplayTV™ service) and Philips® of Eindhoven Netherlands (in combination with TiVo® service of Sunnyvale, Calif.) include a hard disk drive with a storage capacity of between 10 GB and 30 GB that allow recording of up to 30 hours of television programming. These digital video recorders, also referred to as personal video recorders, and the respective services allow the viewer to personalize television viewing. For instance, personal video recorders can learn a viewer's programs and automatically record programs it expects a viewer to like. The viewer can also, among other activities, watch and pause live TV. That is, the viewer can operate a remote control to pause a favorite show when someone calls and pick up the show again exactly where the viewer left off.

Personalized television, like conventional television, is reliant upon commercials. Advertisers try to place their commercials so that a well-defined target group, which is likely to watch certain types of programs, may see the commercials. Personalized television, however, may defeat the advertisers' objectives.

There is therefore a need to improve upon the prior art technique for displaying streaming video data so that it is more likely that an interested viewer in fact watches advertising and that the viewers that see a particular advertisement are a more targeted audience.

SUMMARY OF THE INVENTION

An aspect of the present invention may be regarded as a method of displaying an advertisement on a display in conjunction with displaying of a broadcast stream on the display. A broadcast stream is displayed on the display. A signal is received from a viewer control interface indicating a viewer reaction to the broadcast stream. A viewer profile of the viewer of the display is defined based on the viewer reaction to the broadcast stream. A first advertisement is selected from a plurality of stored advertisements based on the viewer profile of the viewer of the display. The first advertisement is then displayed on the display.

The method may further include updating the viewer profile of the viewer of the display based on signals received by the controller indicating usage of the viewer control interface by the viewer. A second advertisement can then be selected from the stored advertisements based on the updated viewer profile of the viewer of the display. The second advertisement can then be displayed on the display. Updating the viewer profile may include receiving a signal from the viewer control interface indicating a viewer reaction to the first advertisement, and updating the viewer profile of the viewer of the display based on the viewer reaction to the first advertisement. Alternatively, updating the viewer profile may include receiving a signal from the viewer control interface indicating a viewer reaction to the broadcast stream, and updating the viewer profile of the viewer of the display based on the viewer reaction to the broadcast stream. As another alternative, updating the viewer profile may include receiving a signal from the viewer control interface indicating a viewer purchase of a good/service, and updating the viewer profile of the viewer of the display based on the viewer purchase of the good/service. As yet another alternative, updating the viewer profile may include receiving a signal from the viewer control interface indicating a viewer search request, and updating the viewer profile of the viewer of the display based on the viewer search request. Selecting a second advertisement from the stored advertisement based on the updated viewer profile of the viewer of the display and displaying the second advertisement on the display may be repeated until a signal indicative of a positive viewer reaction is received or until a predetermined time period has elapsed.

Selecting the first advertisement from the stored advertisements based on the viewer profile of the viewer of the display may include displaying an identification of at least one of the stored advertisements on the display, and receiving a signal from the viewer control interface selecting the first advertisement to be displayed on the display, such as via a menu on the display, a banner on the display, or an icon on the display.

The first advertisement may be displayed on the display prior to displaying the broadcast stream on the display, in a time slot adjacent to a time slot for displaying regularly scheduled advertisements within the broadcast stream or instead of displaying a regularly scheduled advertisement within the broadcast stream.

The broadcast stream may be a television broadcast stream, a cable broadcast stream, a satellite broadcast stream or an Internet broadcast stream. A plurality of viewers (e.g., a family) may define the "viewer profile." An individual profile may also be used to determine an individual viewer profile at a given time. Advertisements can then be selected based on the individual viewer profile at the current time.

The stored advertisements may be stored on a hard disk drive.

The profile may be transmitted to a head end. The updated profile may be transmitted to a head end.

Another aspect of the present invention may be regarded as a method of displaying an advertisement on a display in conjunction with displaying of a broadcast stream on the display where a viewer profile of the viewer of the display is defined based on the viewer reaction to at least one advertisement. A first targeted advertisement is selected from a plurality of stored advertisements based on the viewer profile of the viewer of the display. The first targeted advertisement is then displayed on the display.

According to another aspect of the present invention, there is provided a personal video recorder for sending an advertisement in conjunction with a broadcast stream to a display. The personal video recorder includes: a viewer control interface configured to allow a viewer to interact with the broadcast stream being displayed on the display; a storage device; and a controller responsive to the viewer control interface and connectable to the display. The controller is configured to receive signals indicating a reaction to the broadcast stream from the viewer control interface, to define a viewer profile of the viewer of the display based on the signals received from the viewer control interface, to select a first advertisement from a plurality of stored advertisements stored on the advertisement storage device based on the viewer profile, and to send the first advertisement to the display.

Another aspect of the present invention may be regarded as a personal video recorder for sending an advertisement in conjunction with a broadcast stream to a display. The personal video recorder includes: a viewer control interface configured to allow a viewer to interact with the broadcast stream being displayed on the display; a storage device; and a controller responsive to the viewer control interface and connectable to the display. The controller is configured to receive signals indicating a reaction to a displayed advertisement from the viewer control interface, to define a viewer profile of the viewer of the display based on the signals received from the viewer control interface, to select a first advertisement from a plurality of stored advertisements stored on the advertisement storage device based on the viewer profile, and to send the first advertisement to the display.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENTS

Figure 1:
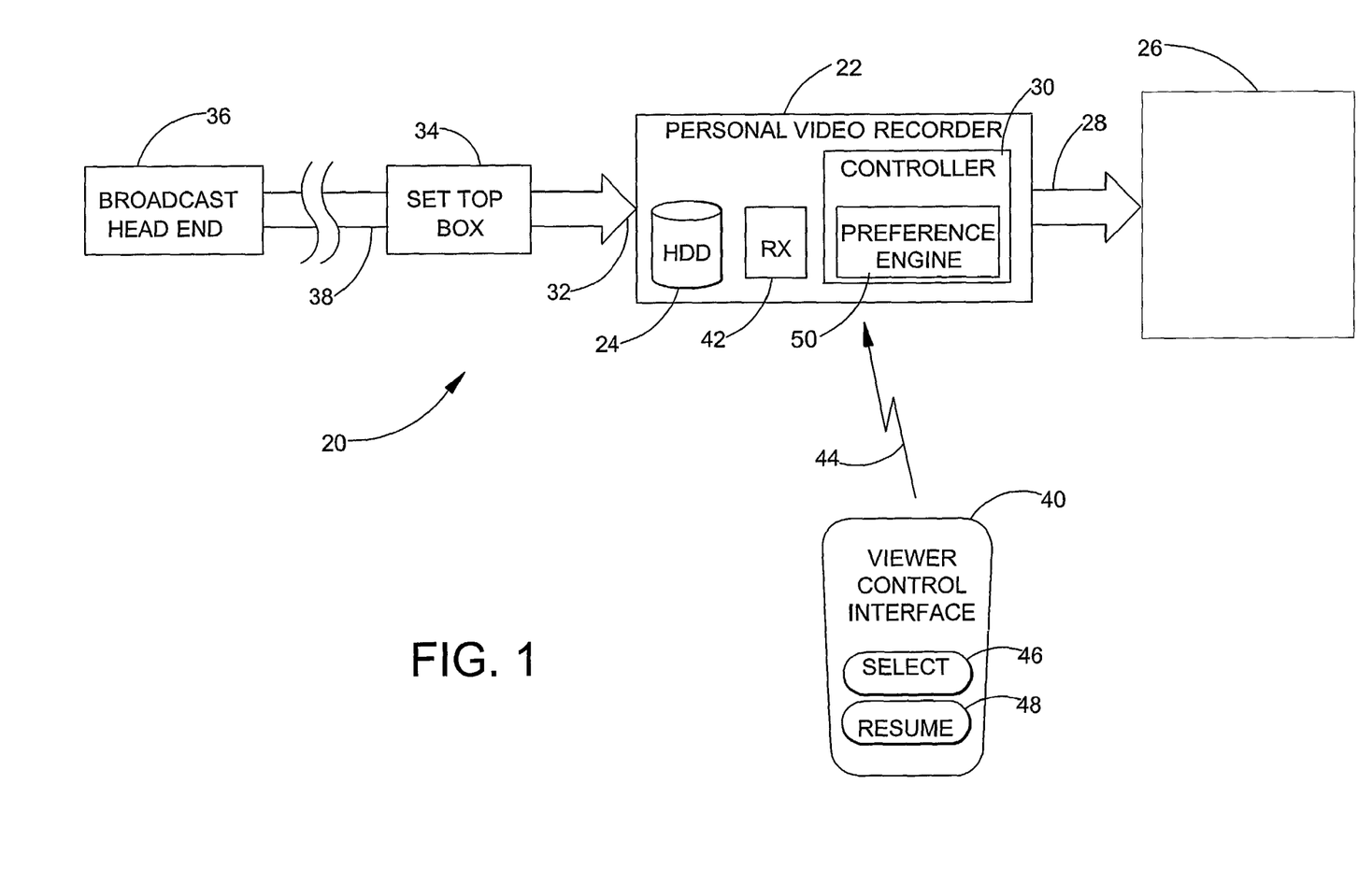
FIG. 1 shows a system for displaying an advertisement in conjunction with displaying streaming video data in accordance with an embodiment of the present invention that includes a personal video recorder having a preference engine for determining a viewer profile and selecting the advertisement to be displayed based on the viewer profile.

FIG. 1 shows an embodiment of a system 20 for displaying a broadcast stream, such as streaming video data, in conjunction with targeted advertisements, in accordance with an embodiment of the present invention, which is configured to operate in accordance with a method of the present invention. The system 20 includes a personal video recorder 22 connected through a data line 28 to a display 26, a set top box 34 connected to a port 32 of the personal video recorder (PVR) 22, a broadcast head end 36 connected through a cable 38 to the personal video recorder 22, and a viewer control interface 40. The following description focuses initially on a description of the method in accordance with one embodiment of an aspect of the present invention. Further details of the system 20 are described below.

The PVR 22 also includes a controller 30 that includes a preference engine 50. The controller receives signals from the viewer control interface 40 indicating viewer interactions with the viewer control interface. The signals may indicate a channel selection command, a fast forward command, a pause command, a rewind command, a record command, a search request command, etc. The preference engine 50 includes the logic for defining a profile and selecting an advertisement from stored advertisements based on the profile as described next.

Figure 2:
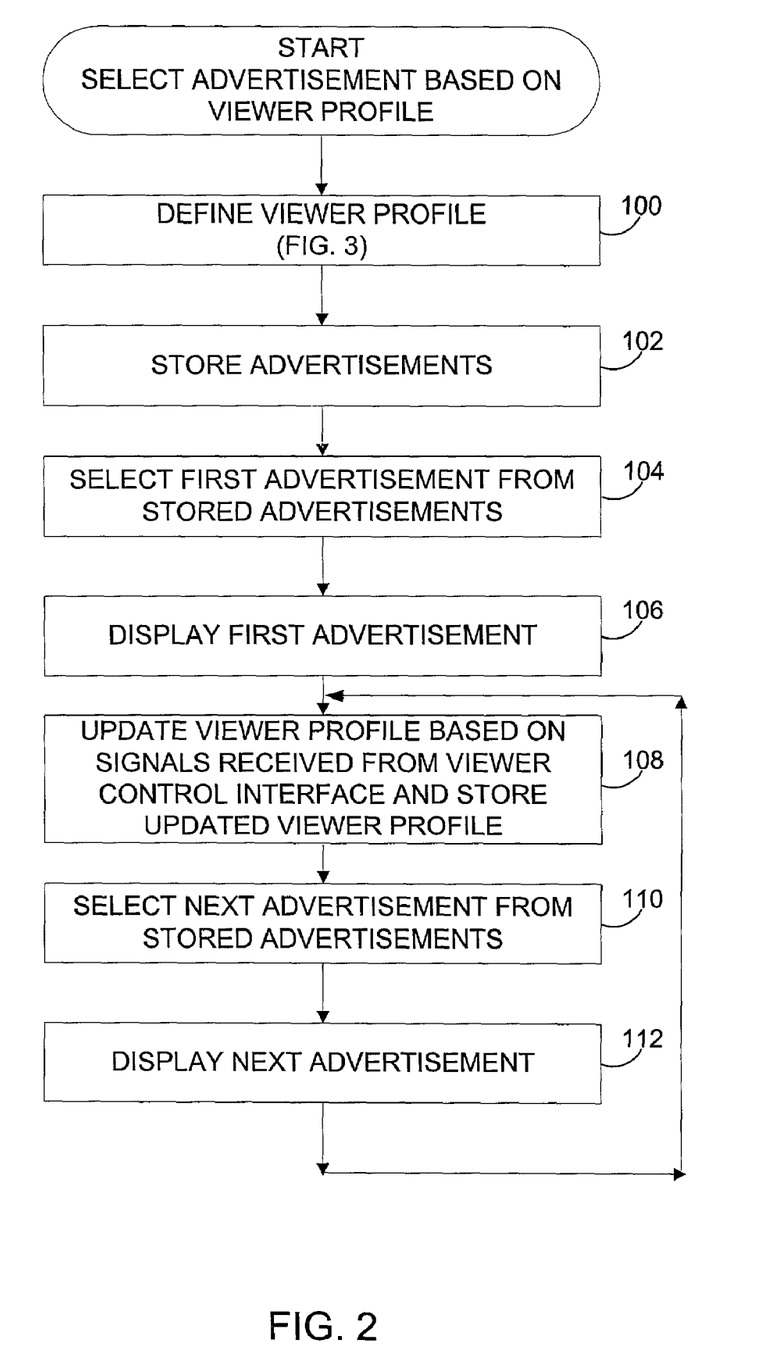
FIG. 2 is a flow chart illustrating exemplary logic in accordance with an embodiment of the present invention that determines a viewer profile and displays an advertisement based on the viewer profile in conjunction with streaming video data.

FIG. 2 is a flow diagram illustrating exemplary logic of a method in accordance with the present invention that displays an advertisement on the display 26 in conjunction with the display of streaming video data (e.g., broadcast stream data) without loss of the streaming video data. The personal video recorder 22 receives streaming video data and the display 26 displays the streaming video data as a program. A viewer profile is determined based on the viewing habits of the user. Advertisements are selected based on the viewer profile. In exemplary embodiments of the invention, an initial profile is determined based on a viewer reaction to a broadcast stream (i.e., normal program). In other embodiments of the inventions, the initial profile is determined based on a viewer reaction to at least one advertisement. In other embodiments of the invention, the initial profile is determined based on at least one viewer purchase of a good/service. In yet other embodiments, the initial profile may be determined by a viewer search request. For example, a viewer may request that all situation comedies be recorded. It will be appreciated that an initial profile may also be determined using various combinations of the methods described above. An advertisement is selected based on the initial profile. The advertisement is displayed. The profile can then be updated based on the viewer reaction to the selected advertisement. Subsequent advertisements are then selected based on the updated profile.

The profile can continuously be updated based on the viewer reaction to the selected advertisements. In exemplary embodiments, the viewer profile can be updated using the same methods that are used to determined the initial profile, e.g., based on a viewer reaction to a displayed broadcast stream, based on a viewer reaction to at least one advertisement, based on at least one viewer purchase of a good/service, based on a viewer search/record request, or some combination thereof.

Figure 3:
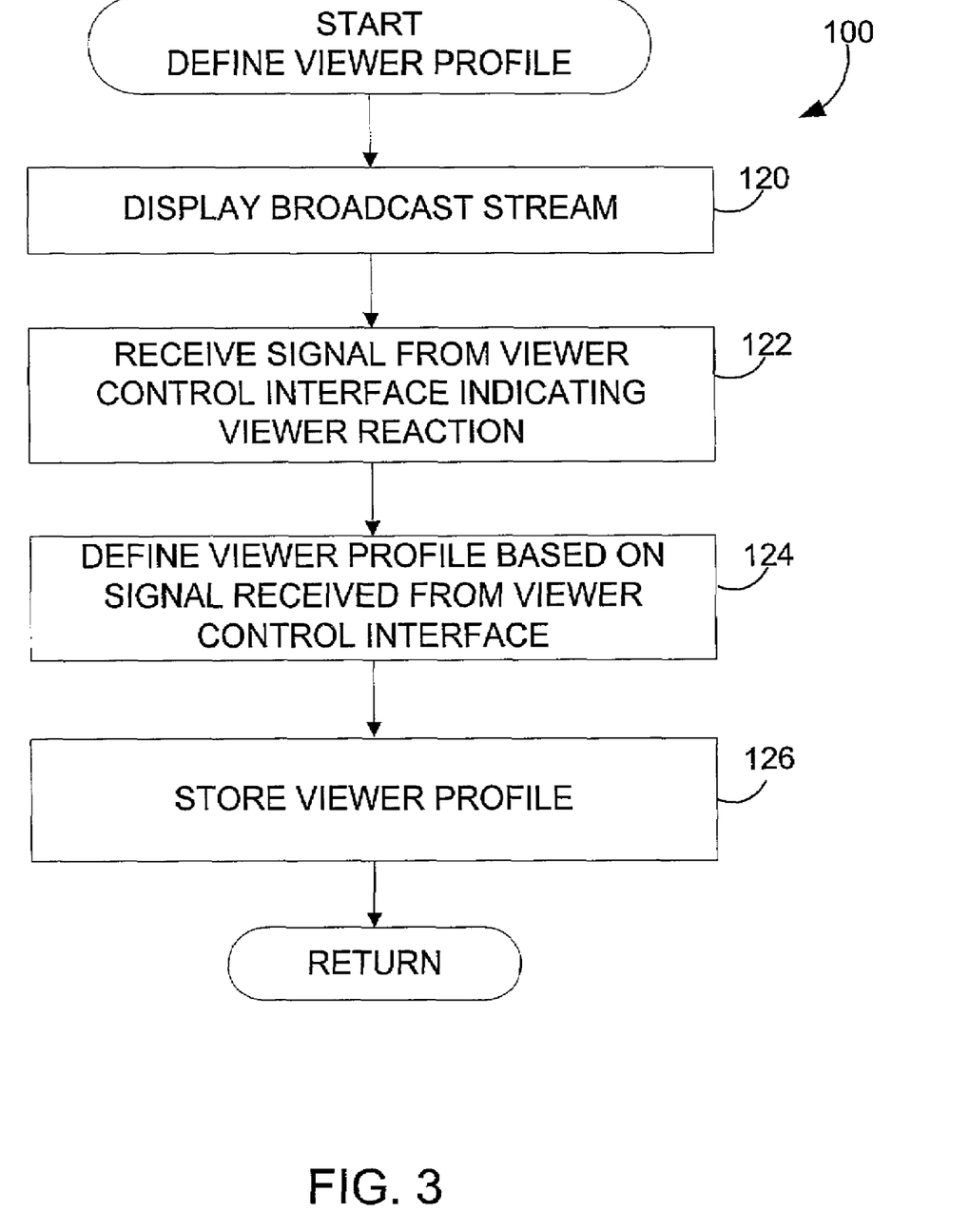
FIG. 3 is a flow chart illustrating exemplary logic in accordance with an embodiment of the present invention for defining a viewer profile.

The logic of FIG. 2 moves from a start block to block 100 where a viewer profile is defined. FIG. 3 illustrates exemplary logic of a method for defining a viewer profile in accordance with the present invention.

The logic of FIG. 3 of defining a viewer profile moves from a start block to block 120 where a broadcast stream is displayed. The broadcast stream or program may be, for example, a movie, a sporting event, a television program (e.g., a situation comedy, a drama, or a cartoon), etc. The broadcast stream may be, for example, a television broadcast stream, a cable broadcast stream, a satellite broadcast stream or an Internet broadcast stream.

The logic moves to block 122 where a signal is received from the viewer control interface 40 indicating a viewer interaction with the viewer control interface. For example, the signal may indicate a viewer reaction to a broadcast stream or to a targeted advertisement. The signal may also indicate a viewer purchase of a good/service or a viewer search/record request. In exemplary embodiments, such as that shown in FIG. 1, the viewer control interface 40 is a remote control. It will be appreciated that in alternative embodiments, other viewer control interfaces may be used, for example, for example, a keyboard or an audio control device.

Figure 4:
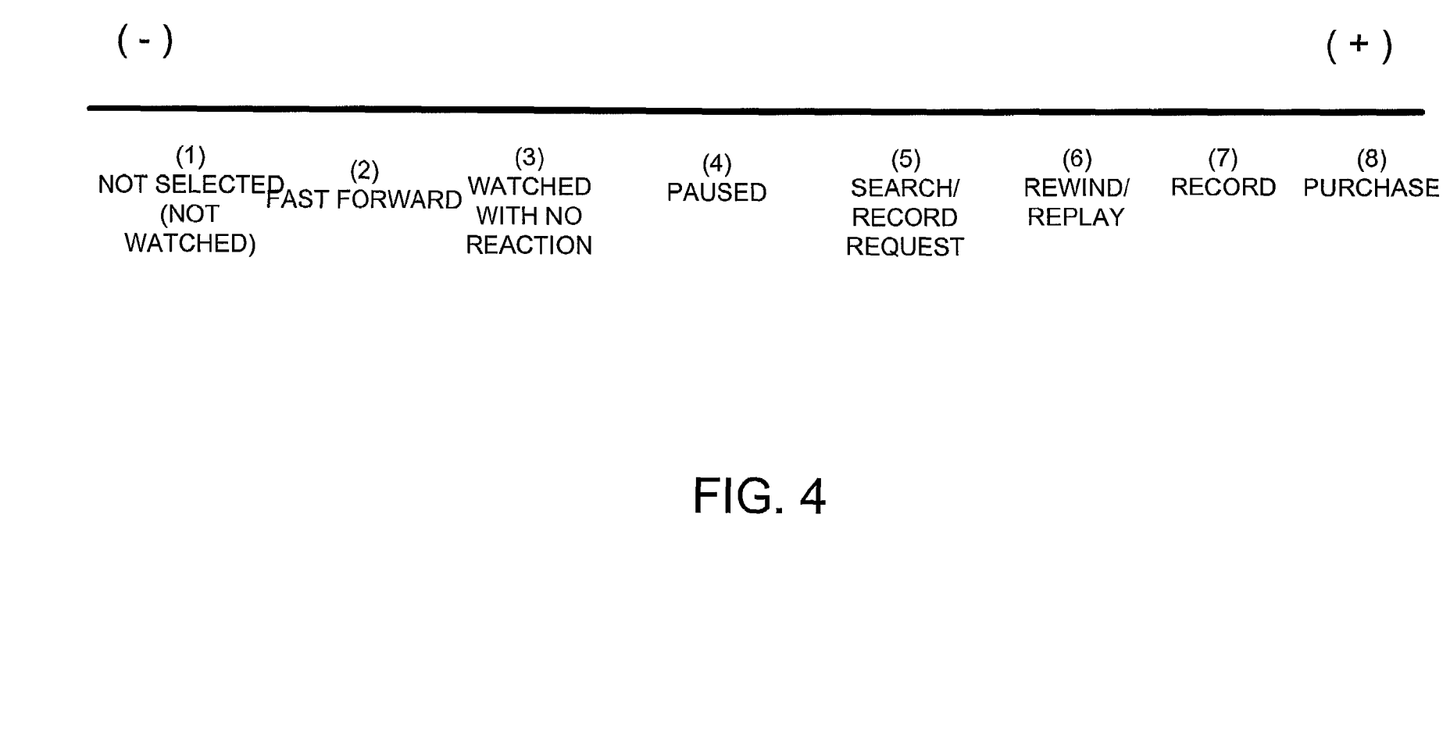
FIG. 4 illustrates a scale of exemplary viewer reactions (ranging from exemplary negative reactions to exemplary positive reactions)

The signal received from the viewer control interface 40 indicates a viewer reaction to what is being displayed on the display 26. For example, if the signal received is a fast forward signal, the viewer reaction is a negative reaction. If the viewer interacts with an interactive display (e.g., selects a menu item to view additional content), the viewer reaction is a positive reaction. If the viewer rewinds and watches the broadcast stream again, the reaction is a positive reaction. If the viewer pauses, the reaction may be viewed as a positive reaction. If the viewer does nothing, the reaction may be viewed as a positive reaction. FIG. 4 illustrates exemplary user reactions. The exemplary user reactions are shown on a scale ranging from negative reactions to positive reactions. In order from most negative to most positive, the exemplary viewer reactions shown in FIG. 4 include: (1) not selecting or not watching a particular broadcast stream; (2) fast forwarding through a particular broadcast stream or advertisement; (3) watching a broadcast stream or advertisement with no specific viewer interaction; (4) pausing; (5) search/record request (e.g., record all situation comedies); (6) rewinding or replaying a broadcast stream or an advertisement; (7) recording a broadcast stream or an advertisement; and (8) making a purchase.

The logic of FIG. 3 proceeds to block 124 where an initial viewer profile is defined based on the signal received from the viewer control interface. For example, if the viewer pauses during a sports program, but fast forwards through cartoons, a viewer profile can be determined. For example, the viewer is interested in sports and is likely a male viewer over the age of twelve. Viewer profile may be defined with varying degrees of specificity. For example, very general profiles may be defined, such as gender, age, income, or some combination thereof Profiles may also be more specific based on the viewing habits, for example, the viewer may appear to be a golf enthusiast, a baseball enthusiast, interested in computers, etc.

One method of determining profiles is by using a matrix that specifies one or more profile attributes based on viewing habits. For example, the matrix may specify that viewers of cartoons are typically children under the age of twelve or that viewers of golf are typically males who golf. After the initial viewer profile is established, the logic moves to block 126 where the viewer profile is stored. For example, in exemplary embodiments, the viewer profile is stored on the hard disk drive 24 and transmitted to the head end 36. It will be appreciated that in alternative embodiments, the viewer profile is stored on the hard disk drive 24 or at the head end 36, but not both. The logic of FIG. 3 then ends and processing returns to FIG. 2.

Returning to FIG. 2, the logic proceeds to block 102 where advertisements are stored. For example, a selection of advertisements may be transmitted during a time when the viewer is not displaying a broadcast stream on the display 26. For example, several automobile advertisements may be received, including one for a family car, one for a sports car and one for a sedan. The most appropriate advertisement may be selected based on the viewer profile. Preferably, the received advertisements are stored on the hard disk drive 24 of the personal video recorder 22.

Next, the logic moves to block 104 where a first advertisement is selected from the stored advertisements (e.g., advertisements stored on the hard disk drive 24). The advertisement is selected based on the viewer profile. Preferably, a viewer profile is determined based on all of the previous viewing habits. Based on the previous viewing habits, it may be apparent that the "viewer profile" is actually an aggregate of multiple individual viewers. For example, children's programs may be displayed on weekend morning and on weekday afternoons, soap operas may be viewed in the morning and early afternoon, movies may be viewed in the evenings and sporting events may be displayed on weekend afternoons. This type of viewing may be typical for a family. Based on these viewing habits, advertisements can be selected by the individual or individuals who are likely to be viewing the display 26 at a given time. Preferably, the selection of the advertisement is also based on the broadcast stream currently being displayed. For example, if a golf tournament is being displayed, then an advertisement for golf equipment (e.g., golf clubs, golf balls, golf clothing, etc.) may be selected.

After the first advertisement is selected based on the viewer profile, it is displayed on the display 26. See block 106. The advertisement may be displayed at various selected times. For example, the advertisement may be inserted prior to the start of a broadcast stream, at the end of a regularly scheduled block of commercials (e.g., on the hour and half-hour marks), or instead of a regularly scheduled commercial. The advertisement may also be displayed upon user request. For example, a menu of available selected commercials may be displayed and the user can select an advertisement from the menu. Alternatively, an indication of the commercial, such as a banner or icon may be displayed in conjunction with the broadcast stream. The user may then select to view the advertisement. The broadcast stream will then be stored and the secondary content, e.g., advertisement will be displayed. Yet another alternative method for displaying advertisements is to display an advertisement until the viewer actually views an advertisement. For example, if the viewer fast-forwards through a selected advertisement, another selected advertisement is displayed. The process is repeated until the user appears to have viewed an advertisement (e.g., does not fast forward through a selected advertisement, does not turn off the PVR 22, does not change channels, etc.).

The logic of FIG. 2 proceeds to block 108 where the viewer profile is updated. The viewer profile may be updated based on the viewer's reaction to the first selected advertisement (e.g., whether the viewer control interface signal indicates a play command, a fast forward command, a pause command, etc.), based on the viewer's reactions to the broadcast steam, based on the viewer's purchases of goods/services, based on the viewer's search/record requests, or based on some combination thereof. The updated viewer profile is stored. Like the initial viewer profile, preferably, the updated viewer profile is stored on the hard disk drive 26 and is also transmitted to the broadcast head end 36 for storage. Subsequent advertisements can be selected based on the updated profile. See block 110. The selected advertisements can then be displayed. See block 112. The process of updating the viewer profile, selecting advertisements based on the viewer profile and displaying advertisements is continually repeated. As described above, the viewer profile may be updated based on a viewer reaction to a broadcast stream, a viewer reaction to a selected advertisement, a viewer purchase, or some combination thereof.

As discussed above, the viewer controls the personal video recorder 22 through the viewer control interface, such as a remote control 40. As illustrated in FIG. 1 by way of example, if the viewer control interface 40 is a remote control, it may communicate with the personal video recorder 22 via a wireless link 44 that conveys control signals using infrared (IR) light. Remote controls and their various functions are generally known in the art. In particular, it is known that IR light is modulated with a specific command, e.g., channel up or down, volume up or down, and the like, and that the controlled device detects and processes the modulated IR light to execute the command in the controlled device. The personal video recorder 22 has a receiver 42 that receives the control signals transmitted by the viewer control interface 40. For example, if the viewer control interface 22 is a remote control, the receiver 42 may be an infrared (IR) receiver that receives the control signals transmitted by the viewer control interface 40.

In an alternative embodiment, the viewer may use the viewer control interface 40, such as a remote control, to control the set top box 34 instead of the personal video recorder 22. The set top box 34 then sends a control signal to the personal video recorder 22 indicating that a viewer command has been received by the set top box 34. The communication between the set top box 34 and the personal video recorder 22 may occur via a communications bus, e.g., a universal serial bus (USB), and appropriate interface circuits.

The cable 38 that connects the set top box 34 to the broadcast head end 36 may be part of a cable TV distribution network that serves a plurality of households. Further, it is contemplated that the cable 38 may connect the set top box 34 to an antenna, a satellite dish or the Internet. Hereinafter, the set top box 34 is described as being connected to the broadcast head end 36.

The broadcast head end 36 provides streaming video data that includes a multitude of channels with a multitude of programs and audio and video data. The broadcast head end 36 may further enable the viewer to subscribe to and receive video-on-demand or pay-per-view services. The format of the streaming video data may be in accordance with known video/television formats such as NTSC, PAL, S-Video or the like.

The set top box 34 includes at least one tuner that selects one of the channels of the streaming video data provided by the broadcast head end 36. Using the viewer control interface 40 or a viewer control interface for the set top box 34, the viewer can control the set top box 34 to tune to the selected channel. It is contemplated that in an alternative embodiment, the set top box 34 and the personal video recorder 22 may be combined in a single unit. Thus, the personal video recorder 22 may receive streaming video data that includes a multitude of channels and may internally tune to a selected channel. Alternatively, the personal video recorder 22 may receive only one channel selected from the multitude of channels by the external set top box 34.

The personal video recorder 22 includes a storage device, such as a hard disk drive (HDD) 24, such as is manufactured by Western Digital Technologies Inc. of Lake Forest, Calif. The hard disk drive 24, for example, has a storage capacity of between 10 GB and 30 GB to selectively store and, thus, record digital information such as sequences of the streaming video data and the advertising data received at the port 32. That is, the hard disk drive 24 may store up to 30 hours of compressed video and audio data. The compression is often achieved by using a standardized process defined by the Moving Picture Expert Group (MPEG), e.g., MPEG-2. The recorded streaming video data and the advertising data are then available for later reproduction.

It is contemplated that in one embodiment, the personal video recorder 2 may be configured to perform MPEG-2 compression and decompression and to selectively store the MPEG-2 compressed video data. In another embodiment, the system 1 may be configured so that the personal video recorder 2 already receives MPEG-2 compressed video data. The personal video recorder 2, thus, selectively stores the MPEG-2 compressed video data without prior compression within the personal video recorder 2. The stored compressed video data may be decompressed outside the personal video recorder 2.

Preferably, the advertisement is transmitted from the broadcast head end 36 to the personal video recorder 22 at a time when a broadcast stream is not being transmitted to the personal video recorder 22 from the broadcast head end 36. For instance, the advertising data may be transmitted during nighttime, e.g., when the display 4 is inactive and the viewer is asleep, and pre-recorded on the personal video recorder 22 like any other stream of video data prior to its presentation. The personal video recorder 22 stores the advertisements on the hard disk drive 24. The advertising data may be transmitted in a dedicated channel that is unrelated to the other channels and their programs. In another embodiment, the advertisements may be transmitted via a modem connection.

Once the advertising data is pre-recorded, it is available to be displayed on the display 26. As discussed above, a banner or an icon representing the advertisement may be displayed while the viewer watches a program as live TV. When the viewer "selects" the banner or icon, i.e., selects to watch the advertisement, the personal video recorder 22 retrieves the pre-recorded advertisement to be displayed and automatically records the program the viewer was watching prior to the selection. Alternatively, as discussed above, the time at which the advertisement is displayed may be determined by the personal video recorder 22 (e.g., the preference engine 50). For example, the secondary content may be displayed just before the primary broadcast stream, along with regularly scheduled advertisements or instead of regularly scheduled advertisements.

Figure 5:
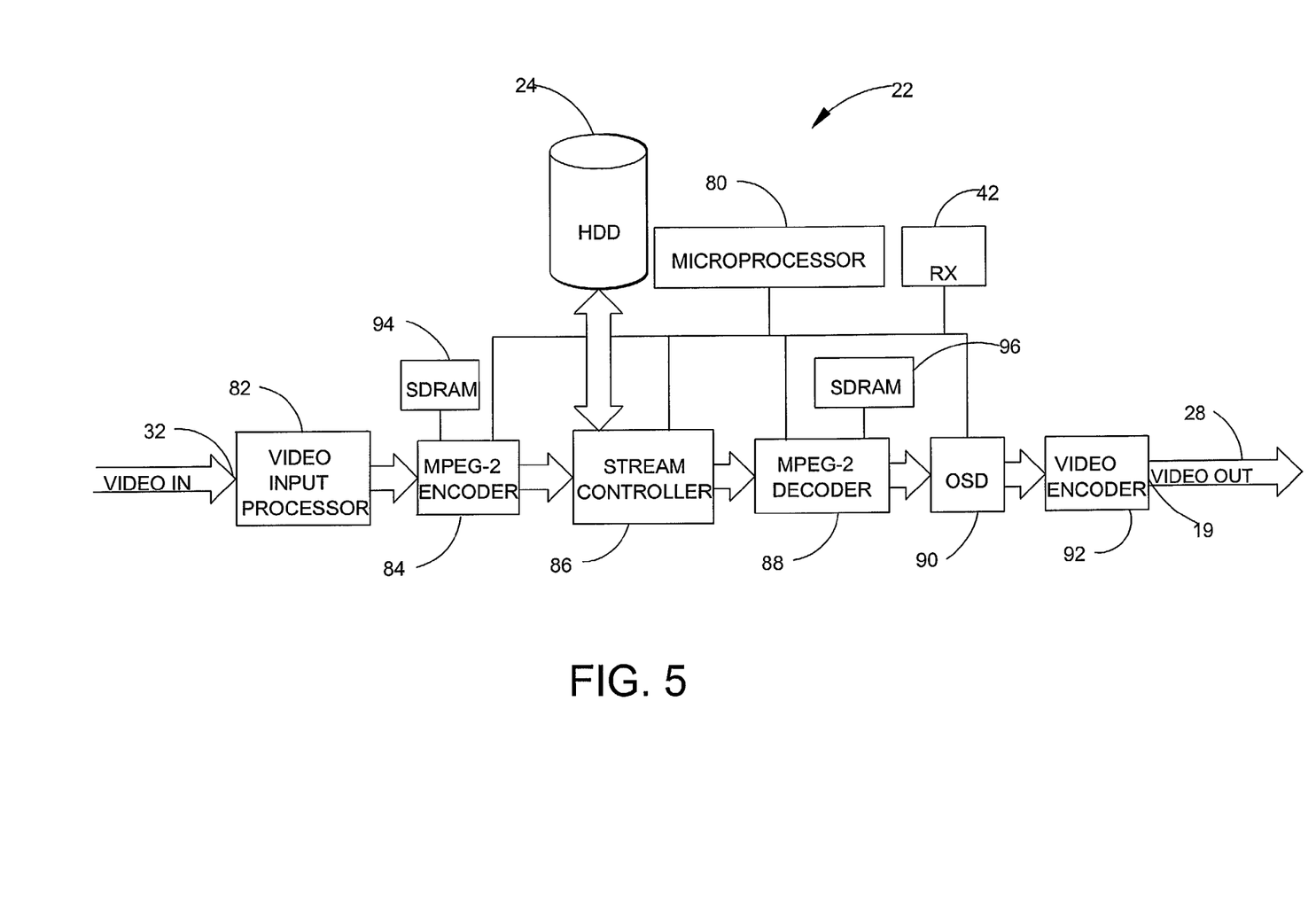
FIG. 5 schematically illustrates an exemplary embodiment of a personal video recorder included in the system of FIG. 1 that includes a hard disk drive for storing advertisements in accordance with the present invention.

FIG. 5 schematically illustrates an exemplary embodiment of a personal video recorder 22 included in the system 20 of FIG. 1. The personal video recorder includes the hard disk drive 24 for storing streaming video data and advertising data in accordance with the present invention. At the port 32, the personal video recorder 22 receives streaming video data, indicated as VIDEO IN, and at a port 29, the personal video recorder 22 outputs streaming video data, indicated as VIDEO OUT. Between the port 32 and the port 29, the personal video recorder 22 has a signal path for streaming video data. The path includes, as seen from the port 32, a video input processor 82, an MPEG-2 encoder 84, a stream controller 86, an MPEG-2 decoder 88, an on-screen graphics driver (OSD) 90 and a video encoder 92. The output of the video encoder 92 is connected to the port 29. As shown in FIG. 5, these components of the personal video recorder 22 are serially arranged along the signal path and are interconnected to convey streaming video data. The MPEG-2 encoder 84 and the MPEG-2 decoder 88 are each connected to a respective SDRAM memory 94, 96. In addition, a microprocessor 80 is connected to communicate with the on-screen graphics driver 90, the stream controller 86, the receiver 42, the MPEG-2 encoder 84 and the MPEG-2 decoder 88. The hard disk drive 8 is coupled to the stream controller 86.

The video input processor 82 receives streaming video data from the set top box 34. This streaming video data is in accordance to NTSC or PAL television standard. The MPEG-2 encoder 84 receives the streaming video data from the video input processor 82 and compresses (i.e., encodes) the streaming video data it in accordance with the MPEG-2 standard. The MPEG-2 encoder 84 outputs an MPEG single program transport stream that can be stored on the hard disk drive 24.

The stream controller 86 receives the MPEG single program transport stream from the MPEG-2 encoder 84. The stream controller 86 generally provides access to the hard disk drive 24 for storage and retrieval of MPEG content. For instance, it controls the pre-recording of the advertising data and its storage in levels of varying detail. In response to a viewer selection, the stream controller 86 retrieves the requested level of detail of the advertising data.

The MPEG-2 decoder 88 performs the inverse function of the MPEG-2 encoder 84. The decompressed MPEG single program stream is input to the on-screen graphics engine 90. The engine 90 is configured to display a user interface to the display (e.g., television set) 26. The video encoder 92 presents the output of the engine 90 to the display 26 by formatting it in accordance with NTSC or PAL requirements.

The microprocessor 80 generally performs the function of controlling the personal video recorder 22. For example, the microprocessor 80 operates the personal video recorder 22 in accordance with commands received from the viewer control interface 40. Further, the microprocessor 80 is configured to operate the personal video recorder 22 in accordance with the invention and to execute the procedure illustrated in FIGS. 2-3. The microprocessor 80 executes the logic of the preference engine 50 for determining a viewer profile and selecting advertisements for display on the display 26 based on the viewer profile. The procedure may be implemented in software, as an application specific integrated circuit, as firmware, or as a combination thereof.

It is contemplated that the personal video recorder 22 includes a real time clock for applications that require knowledge of the current date and time of day. For example, the viewer can program the personal video recorder 22 to record a program on a specific date and time. Further, the personal video recorder 22 assigns a time stamp to each recording. In an alternate embodiment, the real time clock information may be received from the set top box 34. The clock can also be used in determining individual viewer profiles.

Figure 6:
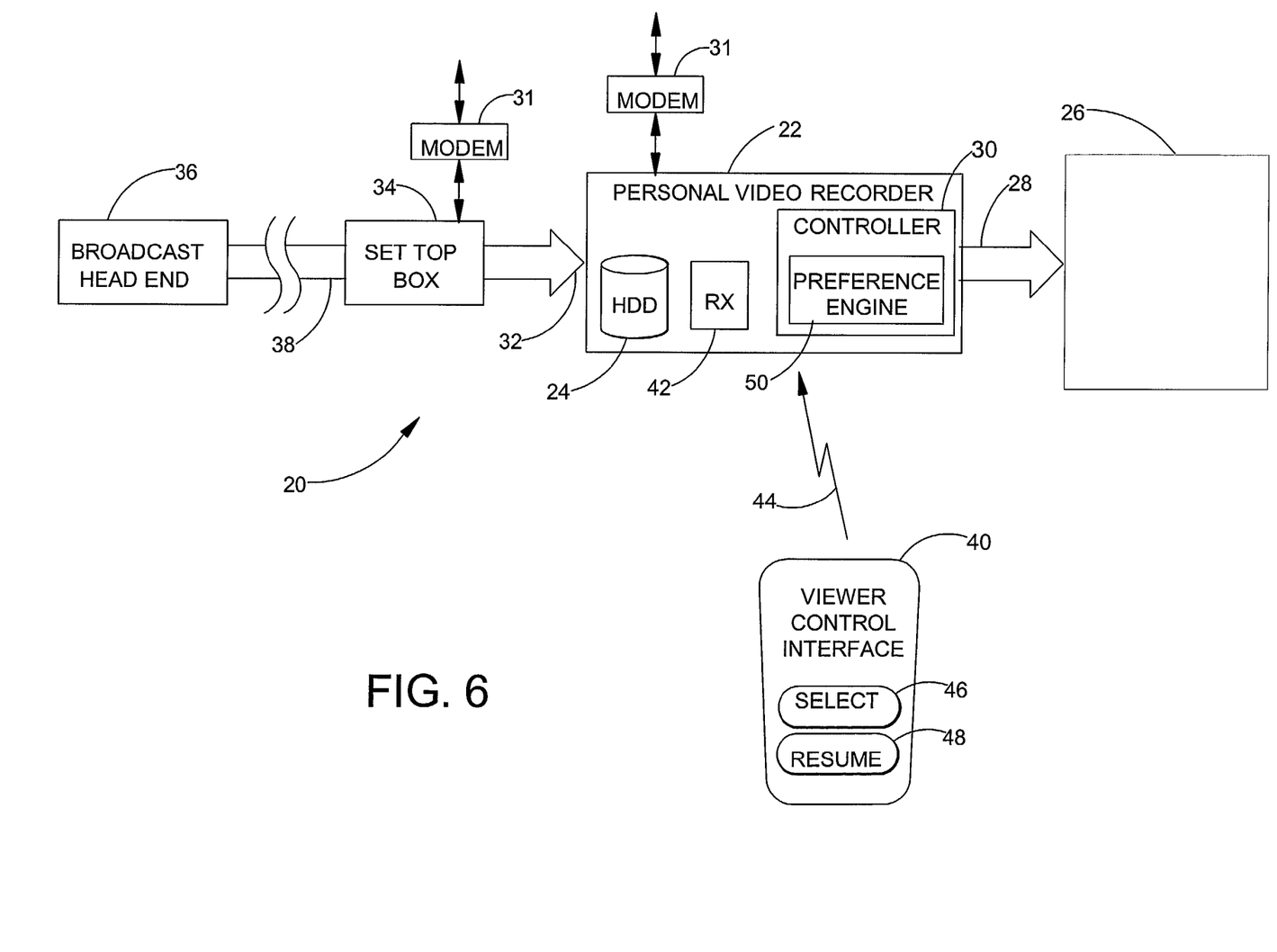
FIG. 6 shows an alternative embodiment of the system shown in FIG. 1 that includes a modem that may be connected to the personal video recorder or a set top box to receive the advertisements.

FIG. 6 shows an alternative embodiment of the system 10 shown in FIG. 1. The alternative embodiment of the system 10 has the same general structure as the system 10 and reference is made to the foregoing description of FIG. 1 for a detailed description of the system 10.

The system 10 shown in FIG. 6 includes a modem 31 that may be connected to the set top box 34 or to the personal video recorder 22. For illustrative purposes, this is illustrated through one modem 31 connected to the set top box 34 and one modem 31 connected to the personal video recorder 22. It is contemplated, however, that the system 10 includes only one modem 31, which may be an internal or external modem connected to a public telephone network (PSTN) or to a (coaxial) cable. In the latter case, the modem 31 is referred to as a cable modem.

The modem 31 may connect the system 10 to the Internet from which the system 10 may receive the advertising data. For instance, the system 10 may automatically access a predetermined web site at predetermined times and download the advertising data. The storage device 24 of the personal video recorder 22 may store this advertising data for later display on the display 26.

What is claimed is:

1. A method for displaying a targeted advertisement to a viewer of a display of an audiovisual system in conjunction with displaying a broadcast stream on the display, the method comprising:
   a. selecting a broadcast stream;
   b. displaying the selected broadcast stream on the display;
   c. receiving a first signal from a viewer control interface indicating a viewer command to the audiovisual system, wherein the audiovisual system is responsive to the viewer command by initiating a corresponding action selected from the group consisting of: fast-forwarding the displayed selected broadcast stream, pausing the displayed selected broadcast stream, and replaying the displayed selected broadcast stream;
   d. defining a viewer profile of the viewer of the display based on a content of the displayed selected broadcast stream, the viewer command indicating a reaction by the viewer to the content of the displayed selected broadcast stream, and a timestamp;
   e. selecting a first advertisement for display during a selected advertisement time from a plurality of stored advertisements based on the viewer profile of the viewer of the display; and
   f. displaying the first advertisement on the display during the selected advertisement time;
      wherein, in response to receiving an additional signal from a viewer control interface indicating a viewer command to the audiovisual system to avoid a currently displayed advertisement during the selected advertisement time, repeating steps (e) and (f) with other selected advertisements from the plurality of stored advertisements until at least one of the plurality of stored advertisements has been displayed on the display during the selected advertisement time without receiving an additional signal from the viewer control interface indicating the viewer command to the audiovisual system to avoid the currently displayed advertisement.

2. The method of claim 1, further comprising:
   g. updating the viewer profile based on a second signal received from the viewer control interface;
   h. selecting a second advertisement from the plurality of stored advertisements based on the updated viewer profile; and
   i. displaying the second advertisement on the display.

3. The method of claim 2, further comprising transmitting the updatedviewer profile to a head end.

4. The method of claim 2, wherein step (g) comprises:
i. receiving a second signal from the viewer control interface indicating a viewer command to the audiovisual system, wherein the audiovisual system is responsive to the viewer command indicated by the second signal by initiating an action selected from the group consisting of: recording the first advertisement, specifying how the first advertisement is displayed on the display, and replaying the first advertisement
ii. updating the viewer profile based on the second signal received from the viewer control interface.

5. The method of claim 4, wherein specifying how the first advertisement is displayed on the display comprises an action selected from the group consisting of: fast forwarding the first advertisement, displaying the first advertisement without modification, and pausing the first advertisement.

6. The method of claim 2, wherein step (g) comprises:
i. receiving a second signal from the viewer control interface indicating a viewer command to the audiovisual system, wherein the audiovisual system is responsive to the viewer command by initiating a purchase of a good/service; and
ii. updating the viewer profile based on the second signal received from the viewer control interface.

7. The method of claim 2, wherein step (g) comprises:
i. receiving a second signal from the viewer control interface indicating a viewer command to the audiovisual system, wherein the audiovisual system is responsive to the viewer command by initiating an action selected from the group consisting of: recording the selected broadcast stream, specifying how the selected broadcast stream is displayed on the display, and replaying the selected broadcast stream; and
ii. updating the viewer profile based on the second signal received from the viewer control interface.

8. The method of claim 2, wherein step (g) comprises:
i. receiving a second signal from the viewer control interface indicating a viewer command to the audiovisual system, wherein the audiovisual system is responsive to the viewer command by initiating a program search; and
ii. updating the viewer profile based on the second signal received from the viewer control interface.

9. The method of claim 2, wherein steps (h)-(i) are repeated until a third signal received from the viewer control interface indicates a positive viewer reaction or until a predetermined period of time has elapsed.

10. The method of claim 1, further comprising transmitting the viewer profile to a head end.

11. The method of claim 1, wherein step (e) comprises:
i. displaying an identification of at least one of the stored advertisements including the first advertisement on the display; and
ii. receiving a second signal from the viewer control interface selecting the first advertisement to be displayed on the display.

12. The method of claim 11, wherein step (e)(i) comprises displaying an identification of at least one of the stored advertisements including the first advertisement via a menu on the display.

13. The method of claim 11, wherein step (e)(i) comprises displaying an identification of at least one of the stored advertisements including the first advertisement via a banner on the display.

14. The method of claim 11, wherein step (e)(i) comprises displaying an identification of at least one of the stored advertisements including the first advertisement via an icon on the display.

15. The method of claim 1, wherein step (f) comprises displaying the first advertisement on the display immediately prior to displaying a second broadcast stream on the display.

16. The method of claim 1, wherein step (f) comprises displaying the first advertisement on the display in a time slot adjacent to a time slot for displaying regularly scheduled advertisements within the broadcast stream.

17. The method of claim 1, wherein step (f) comprises displaying the first advertisement instead of displaying a regularly scheduled advertisement within the broadcast stream.

18. The method of claim 1, wherein the broadcast stream is a television broadcast stream.

19. The method of claim 1, wherein the broadcast stream is a cable broadcast stream.

20. The method of claim 1, wherein the broadcast stream is a satellite broadcast stream.

21. The method of claim 1, wherein the broadcast stream is an Internet broadcast stream.

22. The method of claim 1, further comprising storing the plurality of advertisements on a hard disk drive.

23. The method of claim 1, wherein step (e) comprises:
i. defining at least two individual profiles associated with potentially different viewers based on different portions of the viewer profile; and
ii. selecting the first advertisement based on one of the individual profiles and a time of day that the first advertisement is to be displayed.

24. The method of claim 23, wherein step (f) comprises displaying the first advertisement on the display at the time of day.

25. The method of claim 23, wherein selecting the first advertisement in step (e) is further based on a content of a second broadcast stream being displayed at the time of day.

26. The method of claim 23, wherein the timestamp indicates an evening and the time of day is an evening.

27. The method of claim 1, wherein the displayed broadcast stream is a program.

28. The method of claim 1, wherein the displayed broadcast stream is an advertisement.

29. The method of claim 1, wherein the timestamp indicates a time of the viewer command within the displayed broadcast stream.

30. The method of claim 1, wherein the timestamp indicates a time of day.

31. The method of claim 1, wherein the viewer command to avoid the currently displayed advertisement comprises at least one of the following:
a power off command; or
a change channel command.

* * * * *